United States Patent
Aoki (10) Patent No.: US 6,626,460 B2
(45) Date of Patent: Sep. 30, 2003

(54) ACTUATOR CONTROL METHOD

(75) Inventor: Hiroshi Aoki, Tokyo (JP)

(73) Assignee: Takata Corporation, Tokyo (JP)

( * ) Notice: Subject to any disclaimer, the term of this patent is extended or adjusted under 35 U.S.C. 154(b) by 22 days.

(21) Appl. No.: 09/880,098

(22) Filed: Jun. 14, 2001

(65) Prior Publication Data

US 2002/0027345 A1 Mar. 7, 2002

Related U.S. Application Data

(60) Provisional application No. 60/211,369, filed on Jun. 14, 2000, and provisional application No. 60/211,803, filed on Jun. 16, 2000.

(51) Int. Cl.$^7$ ............................................... B60R 21/00
(52) U.S. Cl. ........................................ 280/735; 701/45
(58) Field of Search ............................ 280/735; 701/45

(56) References Cited

U.S. PATENT DOCUMENTS

| | | | | |
|---|---|---|---|---|
| 5,398,185 A | * | 3/1995 | Omura ........................ | 180/268 |
| 5,785,347 A | | 7/1998 | Adolph et al. .............. | 280/735 |
| 5,788,281 A | * | 8/1998 | Yanagi et al. ............... | 180/282 |
| 5,900,677 A | * | 5/1999 | Musiol et al. .............. | 180/208 |
| 5,906,393 A | | 5/1999 | Mazur et al. ............... | 280/735 |
| 6,161,439 A | * | 12/2000 | Stanley ....................... | 280/735 |
| 6,186,539 B1 | | 2/2001 | Foo et al. ................... | 280/735 |
| 6,198,997 B1 | * | 3/2001 | Ishikawa et al. ............ | 180/282 |
| 6,260,879 B1 | * | 7/2001 | Stanley ....................... | 180/268 |
| 6,264,236 B1 | * | 7/2001 | Aoki ........................... | 180/268 |
| 6,282,473 B1 | * | 8/2001 | Steffens, Jr. ................ | 180/272 |
| 6,311,112 B1 | * | 10/2001 | Mazur et al. ............... | 180/282 |

FOREIGN PATENT DOCUMENTS

JP          2000-127890         9/2000

* cited by examiner

Primary Examiner—Lesley D. Morris
Assistant Examiner—L. Lum
(74) Attorney, Agent, or Firm—Foley & Lardner (57) ABSTRACT

A method of suitably controlling an airbag device or a pretensioner without imposing a burden on an airbag deployment control system and without complicating the wiring and logic for information interchange. A load discriminator receives an output from seat load cells and binarizes the output of the seat load cells, i.e. the weight of an occupant, with reference to two different threshold values corresponding to ON and OFF of the buckle switch, thereby obtaining two results. The weight discriminator sends the respective results to an airbag controller. The airbag controller receives the results and an ON/OFF signal from the buckle switch, employs the result according to the threshold value corresponding to the actual ON/OFF state of the buckle switch, and judges the kind (adult or child) of the occupant based on the employed result. Then, the airbag controller judges the actuation of the airbag based on this discrimination. When a collision occurs the airbag controller controls the deployment of the airbag based on the judgment for the actuation.

5 Claims, 6 Drawing Sheets

ACTUATOR CONTROL METHOD

CROSS REFERENCE TO RELATED APPLICATIONS

The present application claims priority to and the benefit of the following U.S. Provisional Patent Applications:

Ser. No. 60/211,369 filed Jun. 14, 2000; and
Ser. No. 60/211,803 filed Jun. 16, 2000

The foregoing provisional applications are incorporated by reference herein in its entirety.

BACKGROUND

The present invention relates to a method of controlling the operation of an airbag device, a pretensioner, and the like in a passenger car.

As for an airbag device for protecting an occupant in the event of an accident such as a collision, some methods of controlling the deployment of an airbag have been proposed for increasing the safety. According to these methods, it is determined whether the occupant is an adult or a child and the deployment of the airbag is controlled in case that the occupant is a child. Also as for a pretensioner for winding up a seat belt in the event of a collision, methods for controlling the operation of the pretensioner depending on the determination of whether the occupant is an adult or a child have been proposed.

For determining whether the occupant is an adult or a child, seat load cells are disposed beneath a seat squab for measuring the weight of an occupant sitting on the seat. The measured weight is classified as one of two categories (hereinafter, classifying a value as one of two categories will be referred to as "binarizing") with reference to a certain threshold value to determine whether the occupant is an adult or a child.

However, these conventional methods require careful consideration when setting the threshold value for determining whether the occupant is an adult or a child. When the occupant wears a seat belt, the tension of the seat belt is also applied to the seat load cells so that the weight of the occupant to be measured by the seat load cells should be heavier than the actual weight of the occupant. Therefore, the threshold value when the occupant wears the seat belt should be set greater than the threshold value when the occupant does not wear the seat belt. To cope with such a demand, there is a way that a buckle switch is provided for detecting the latch between a buckle and a tongue of the seat belt and the setting value of the threshold is changed according to ON/OFF of the buckle switch.

Generally, a controller for controlling the deployment of an airbag and/or controlling the operation of a pretensioner is required to respond at high speed. Accordingly, it is required to make its control logic as simple as possible. Under this situation, it is not desired to conduct a complex logic for changing the threshold value for seat load according to ON/OFF of the buckle switch or a signal from other sensors when determines whether an occupant is an adult or a child based on the threshold value.

On the other hand, the determination of whether the occupant is an adult or a child can be made by using a logic of a device for measuring the seat load by changing the threshold value for the seat load. In this case, the output of a buckle switch and/or other sensor can also inputted into the device for measuring the seat load or the output should be transmitted to the device for measuring the seat load from a controller for controlling the deployment of the airbag, thus complicating the wiring and the logic for information interchange.

The present invention is made under the above-mentioned circumstances and one of the objects of the present invention is to provide a method of suitably controlling an airbag or a pretensioner by determining whether an occupant is an adult or a child by using different threshold values corresponding to ON and OFF states of a sensor, without imposing a burden on an airbag deployment control system and without complicating the wiring and the logic for information interchange.

SUMMARY OF THE INVENTION

The aforementioned object is achieved by a method for determining the kind of an occupant sitting on a vehicle seat based on the combination of the weight of the occupant and an ON/OFF signal of a sensor. According to the present invention a method of controlling an actuator according to the kind of the occupant determined to be sitting on the seat is provided. In the method, a load discriminator and an actuator controller are separately disposed. The load discriminator determines the kind of the occupant based on respective threshold values corresponding to ON and OFF signals of said sensor to get respective results and outputs the results to the actuator controller. The actuator controller receives an ON/OFF signal from said sensor, judges the actual kind of the occupant by combining the ON/OFF signal of said sensor and the output of the load discriminator, and controls the actuator based on the result of the judgment.

In this method, the load discriminator determines the kind of the occupant based on the respective threshold values corresponding to the combinations of ON/OFF states of sensors (other than weight sensors) such as a buckle switch, to get respective results and outputs the results to the actuator controller. The load discriminator may receive inputs corresponding to the ON/OFF state of a single sensor or a number of sensors. The actuator controller receives the combination of ON/OFF states of the aforementioned sensors, judges the actual kind of the occupant by combining the combination of ON/OFF states and the output of the load discriminator, and controls an airbag device and a pretensioner based on the result of the judgment. Therefore, this method eliminates the complexity of logic (algorithm) of the actuator controller and eliminates the necessity of inputting the outputs of a buckle switch and/or other sensors into a load discriminator.

According to an alternative embodiment of the present invention a method for controlling the actuation of an airbag protecting an occupant of a vehicle seat is provided. The method includes the step of determining in a load discriminator whether the load applied to the vehicle seat corresponds to a child or an adult using a first threshold load value and generating a corresponding first result. The method further includes determining in the load discriminator whether the load applied to the vehicle seat corresponds to a child or an adult using a second threshold load value and generating a corresponding second result. The second threshold value is selected based on the occupant being protected by a buckled seat belt. The first and second results may be provided to an airbag controller. A determination is made whether a seat belt protecting the occupant is buckled and an input is provided to the controller corresponding to the buckled state of the seatbelt. The method includes judging in the controller whether the occupant is a child or an adult, and controlling the airbag based on the type of occupant.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below and which constitute part of this specification.

DETAILED DESCRIPTION

Figure 1:
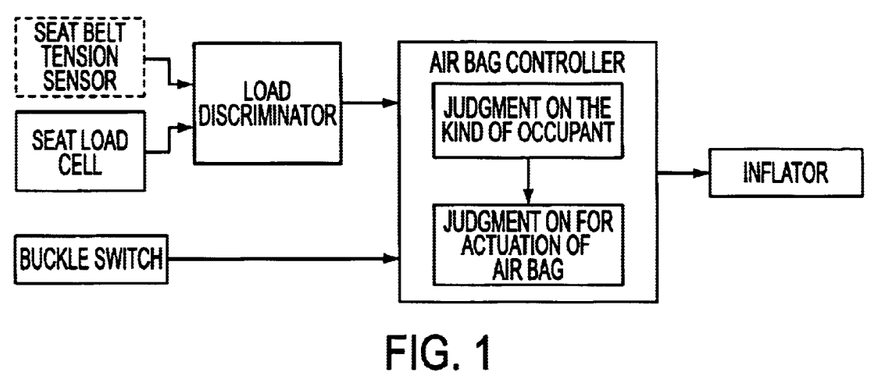
FIG. 1 is a system block diagram showing an airbag deployment control system to which an embodiment of the present invention is applied.

Hereinafter, embodiments of the present invention will be described with reference to the attached drawings. FIG. 1 is a system block diagram showing an airbag deployment control system to which an embodiment of the present invention is applied.

A load discriminator receives an output from seat load cells, and binarizes the output of the seat load cells, i.e. the weight of an occupant, with reference to two different threshold values corresponding to ON and OFF of the buckle switch, thereby obtaining two results. The weight discriminator sends the respective results to an airbag controller. The airbag controller receives the signal indicating the results and an ON/OFF signal from the buckle switch, employs the result according to the threshold value corresponding to the actual ON/OFF state of the buckle switch, and judges the kind (adult or child) of the occupant based on the employed result. Then, the airbag controller judges the actuation of the airbag device based on this judgment. When a collision is actually occurred, the airbag controller controls the deployment of the airbag based on the judgment for the actuation.

Figure 2:
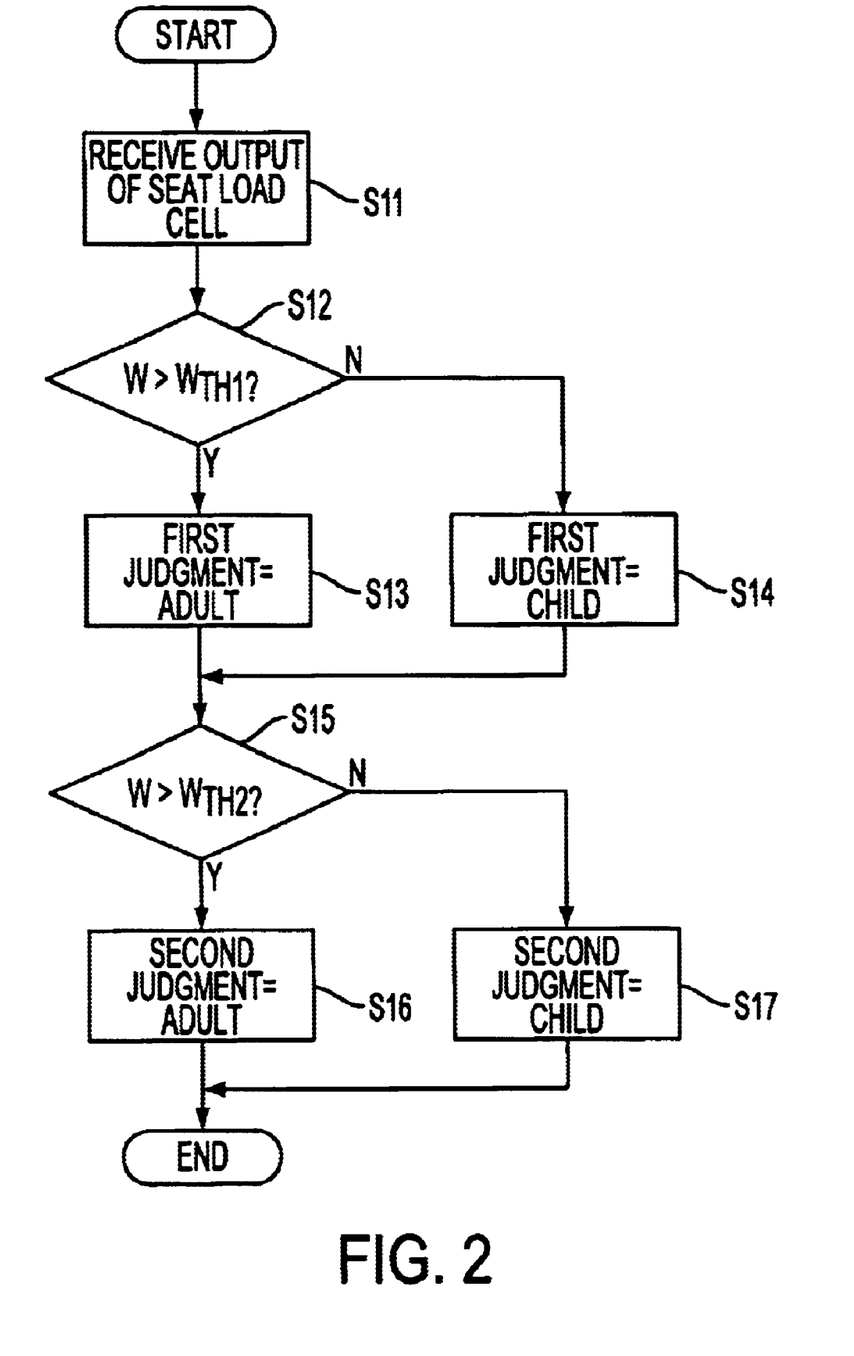
FIG. 2 is a flow chart illustrating the function of a load discriminator.

FIG. 2 shows a flow chart as an example illustrating the function of the load discriminator. This routine is repeated at predetermined intervals. In Step S11, the discriminator receives an output W of the seat load cells. In Step S12, the discriminator judges whether the output W is greater than a first threshold value $W_{TH1}$. The first threshold value $W_{TH1}$ is a setting value of threshold for discrimination between adult and child when the buckle switch of the seat belt is OFF, i.e. when the seat belt is not worn. For example, the setting value for the first threshold value $W_{TH1}$ may be 28.8 kgf. When W>$W_{TH1}$, the procedure proceeds to Step S13 where the first judgment results in ADULT. When not, the procedure proceeds to Step S14 where the first judgment results in CHILD.

Then, in Step S15, the discriminator judges whether the output W is greater than a second threshold value $W_{TH2}$. The second threshold value $W_{TH2}$ is a setting value of threshold for discrimination between adult and child when the buckle switch of the seat belt is ON, i.e. when the seat belt is worn. For example, the setting value for the second threshold value $W_{TH1}$ may be 32.9 kgf. When W>$W_{TH2}$, the procedure proceeds to Step S16 where the second judgment results in ADULT. When not, the procedure proceeds to Step S17 where the second judgment results in CHILD.

As mentioned above, the load discriminator makes judgments for both cases regardless of whether the buckle switch is ON or OFF and gets the results. For example, the result is converted into a signal with two bits such as "00", "10", "11" assuming ADULT as 1 and CHILD as "0" and then transmitted to the airbag controller. It should be noted that the Most Significant Bit ("MSB") corresponds to the first judgment and the Least Significant Bit ("LSB") corresponds to the second judgment. Since normally $W_{TH2}$>$W_{TH1}$, the signal "01" is never outputted.

Figure 3:
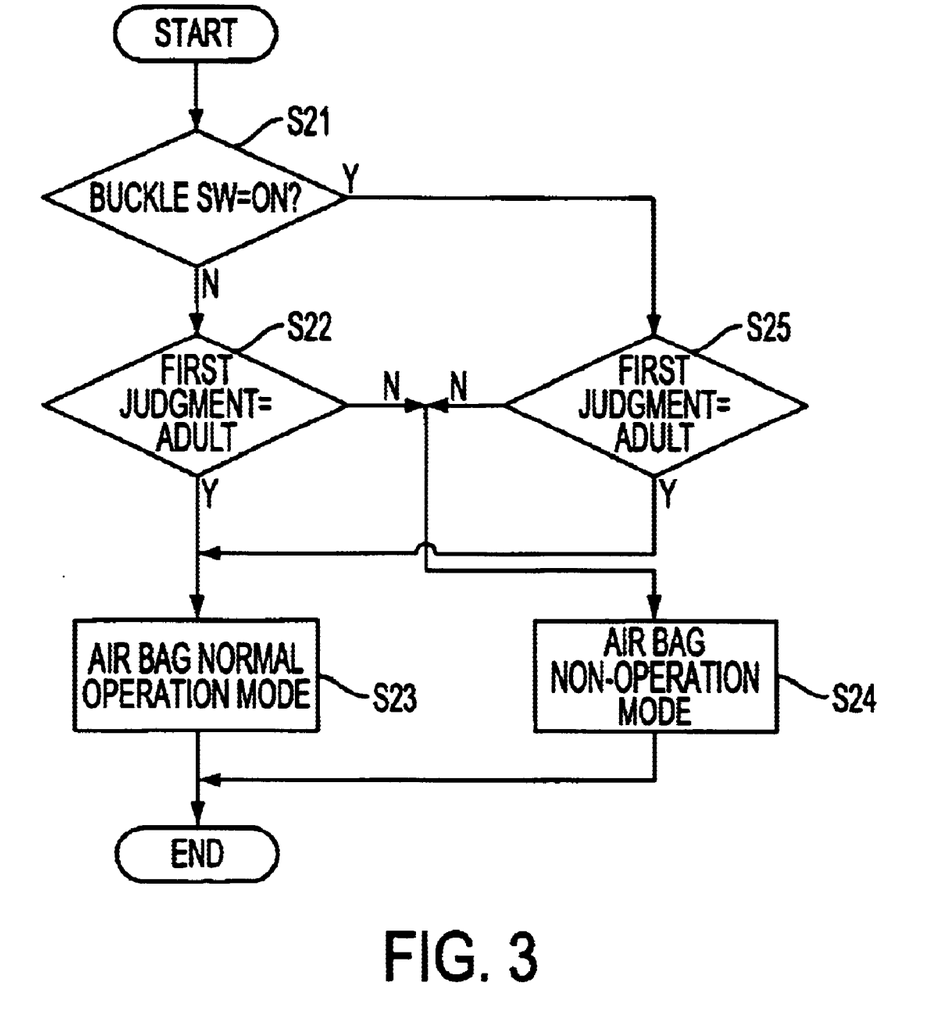
FIG. 3 is a flow chart illustrating the function of determining the kind of occupant among functions of an airbag controller.

FIG. 3 shows a flow chart illustrating the function of judging the kind of an occupant among the functions of the airbag controller. This routine is repeated at predetermined intervals. In Step S21, the controller receives the state of the buckle switch to discriminate between ON and OFF of the buckle switch. When the buckle switch is OFF, the procedure proceeds to Step S22 where the controller checks whether the result of the first judgment in the signal sent from the load discriminator is ADULT. In other words in regard to the aforementioned example, the controller checks whether the MSB is "1". When the result is ADULT (i.e. "1"), the procedure proceeds to Step 23 where the controller sets the operation into a normal mode for normally deploying the airbag. When the result is not ADULT (i.e. "0"), the procedure proceeds to Step 24 where the controller sets the operation into a non-operation mode.

When the buckle switch is ON in Step S21, the procedure proceeds to Step S25 where the controller checks whether the result of the second judgment in the signal sent from the load discriminator is ADULT. In other words in regard to the aforementioned example, the controller checks whether the LSB is "1". When the result is ADULT (i.e. "1"), the procedure proceeds to Step 23 where the controller sets the operation into the normal operation mode for normally deploying the airbag. When the result is not ADULT (i.e. "0"), the procedure proceeds to Step 24 where the controller sets the operation into the non-operation mode.

Figure 4:
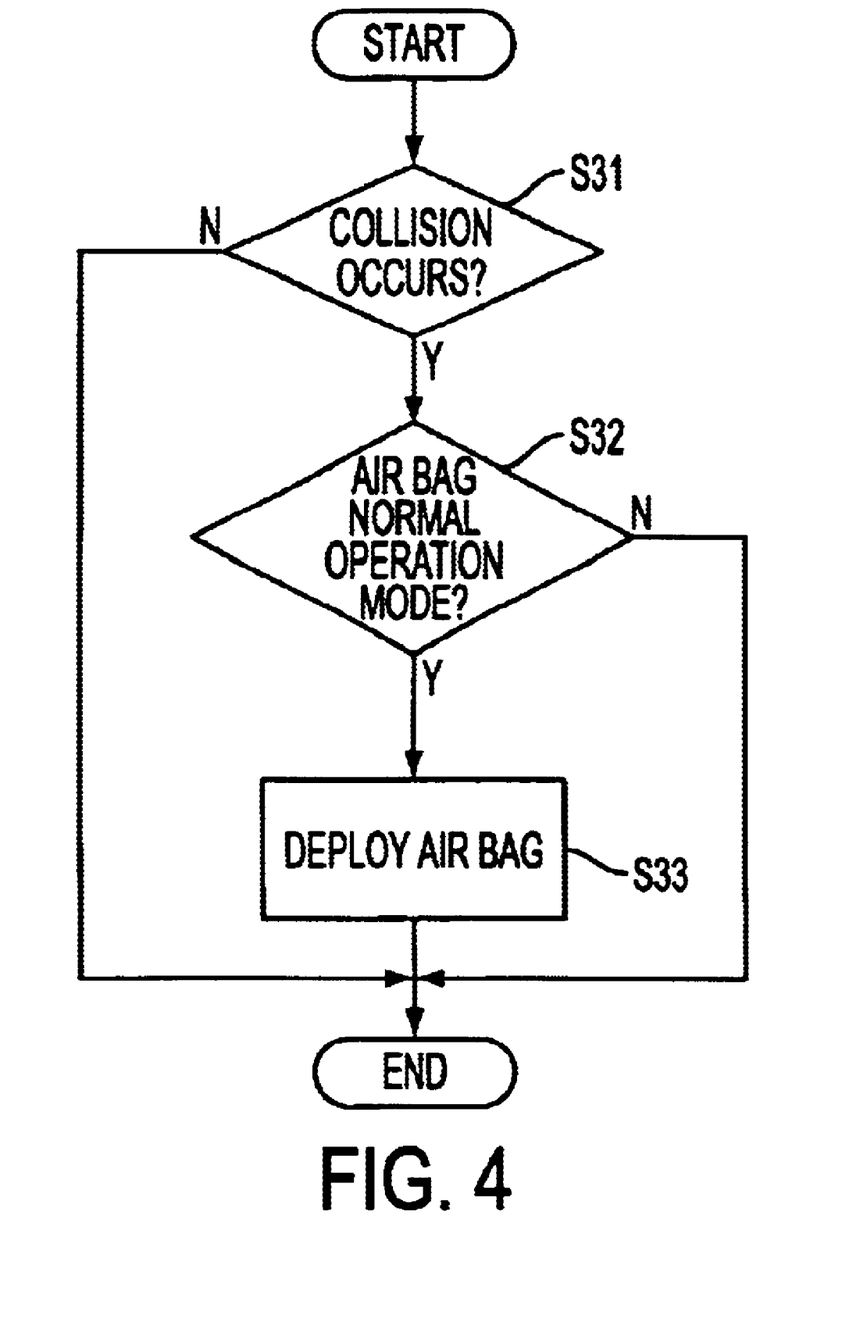
FIG. 4 is a flow chart illustrating the function of determining the activation of the airbag among the functions of the airbag controller.

FIG. 4 shows a flow chart illustrating the function of judging the activation of the airbag among the functions of the airbag controller. This routine is repeated at predetermined intervals. In Step S31, the controller determines whether a collision occurs. When no collision occurs, the procedure is terminated. When a collision occurs, the procedure proceeds to Step S32 where the controller checks whether the operation is set in the normal operation mode in the procedure of judging the kind of occupant. When the operation is set in the normal operation mode, the procedure proceeds to Step S33 where the controller triggers an inflator to normally deploy the airbag. When the operation is not set in the normal operation mode, the procedure is terminated without deployment of the airbag.

The measured values employed in the above-mentioned example is the signal of the buckle switch as a sensor other than the seat load cells. As another sensor, sensors relating to the tension of the seat belt such as locking information of Automatic Locking Retractor ("ALR"), and ON/OFF signal of the Belt Tension Sensor ("BTS") may also be employed. It is preferable that the threshold value for discrimination between adult and child can be changed according to ON/OFF signals of such sensors.

Figure 6:
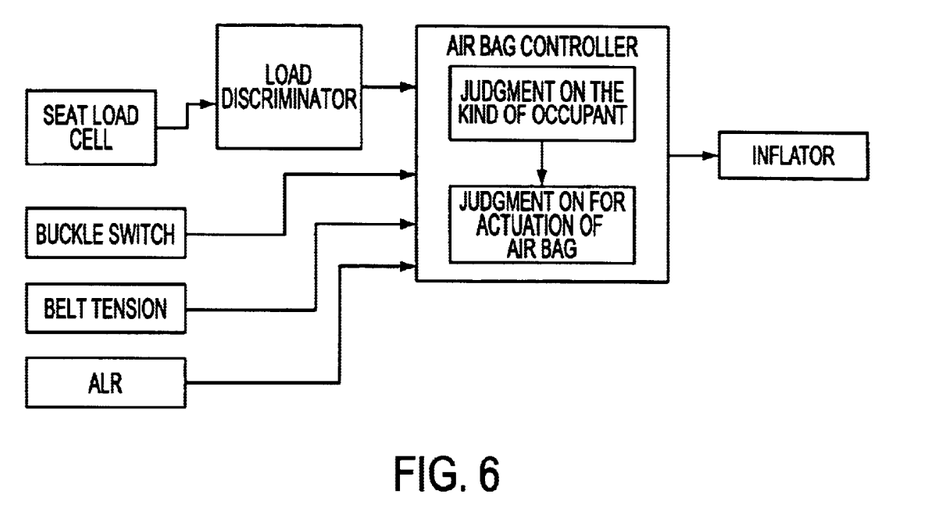
FIG. 6 is a system block diagram showing an airbag deployment control system to which an alternative embodiment of the present invention is applied.

For example, in case of employing three sensors, the number of combinations of ON/OFF should be $2^3=8$ in maximum (the number must be less than this because the combinations includes ones that are practically impossible.). A threshold value is set for each possible combination and the load discriminator determines for every threshold values whether the load exceeds the threshold value. In case of employing three sensors, the result of judgments with regard to the respective threshold values are indicated by a signal with 8 bits. This signal is transmitted to the airbag controller. As shown in FIG. 6, the airbag controller judges ON/OFF states of three sensors based on input from each of the three sensors and determines which bit of the signal is used for controlling the operation of the airbag.

Though the judgment is made according to each of different threshold values corresponding to ON and OFF of the buckle switch in the embodiment as mentioned above, only one threshold value may be employed. In this case, a judgment is made by comparing the seat load with the threshold value when the buckle switch is OFF and a judgment is made by subtracting a value, obtained by multiplying the belt tension by a coefficient, from the seat load to obtain a differential therebetween and comparing the differential with the threshold value.

Figure 5:
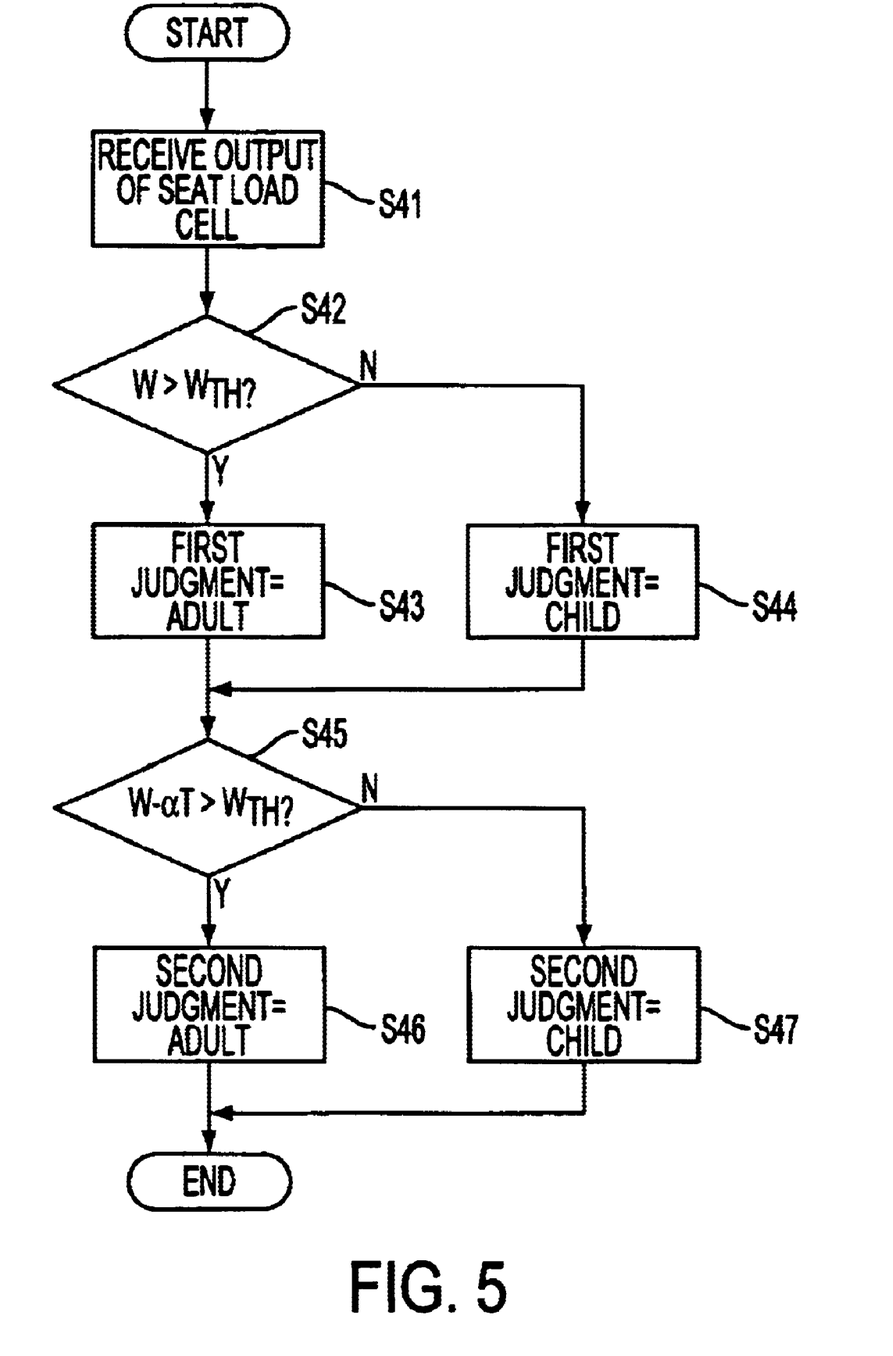
FIG. 5 is a flow chart illustrating another example of the function of the load discriminator.

In this case, the output of a seat belt tension sensor is inputted into the load discriminator as shown by a broken line in FIG. 1 and its flow chart is shown in FIG. 5 instead of the flow chart shown in FIG. 2.

Reference to FIG. 5, in Step S41, discriminator receives an output W of the seat load cells. In Step S42, the discriminator discriminates whether the output W is greater than a threshold value $W_{TH}$. The threshold value $W_{TH}$ is a threshold for discrimination between adult and child when the buckle switch of the seat belt is OFF, i.e. when the seat belt is not worn. For example, the setting value for the threshold value $W_{TH}$ is 28.8 kgf. When $W>W_{TH}$, the procedure proceeds to Step S43 where the first judgment results in ADULT. When not, the procedure proceeds to Step S44 where the first judgment results in CHILD.

Then, in Step S45, the discriminator calculates a differential $(W-\alpha T)$ between the output W and a value, obtained by multiplying a seat belt tension T by an influence coefficient $\alpha$, and judges whether the differential $(W-\alpha T)$ is greater than the threshold value $W_{TH}$, wherein the belt tension T is measured by the seat belt tension sensor. This judgment is made on the assumption that the seat belt is worn, i.e. the buckle switch is ON. Because the seat load W measured is influenced by the seat belt tension T, the influenced value should be subtracted from the seat load W to be compared to the threshold value $W_{TH}$. Since the influence coefficient $\alpha$ depends on the relative position between a vehicle seat and the seat belt, $\alpha$ is determined for each vehicle model based on experiences. When $(W-\alpha T)>W_{TH}$, the procedure proceeds to Step S46 where the second judgment results in ADULT. When not, the procedure proceeds to Step S47 where the second judgment results in CHILD.

The function of determining the kind of occupant as shown in FIG. 3 and the function of determining the activation of the airbag as shown in FIG. 4 can be also applied to this case.

Though the above description is made as regard to the control for the deployment of the airbag, this idea can be applied to the control for a pretensioner of a seat belt.

As described above, the present invention eliminates the complexity of logic (algorithm) of an actuator controller and eliminates the necessity of inputting the output of a sensor such as a buckle switch, other than a weight sensor, into a load discriminator. Therefore, the load discriminator can be applied in common to all. The actuator controller can cope with various applications by changing selective portions according to the existence of or the number of sensors.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims and equivalents thereof.

What is claimed is:

1. An actuator control method for determining a kind of an occupant sitting on a vehicle seat based on a combination of the weight of the occupant and an ON/OFF signal of a sensor and for controlling an actuator according to the kind of occupant determined, comprising the steps of:

providing a load discriminator and an actuator controller that are separately disposed;

judging the kind of occupant using the load discriminator based on respective threshold values corresponding to ON and OFF signals of the sensor to obtain a result;

outputting the result to the actuator controller; and wherein the actuator controller receives an ON/OFF signal from said sensor, judges the kind of the occupant by combining the ON/OFF signal of said sensor and the output of the load discriminator, and controls the actuator based on a result of the judgment.

2. A method for controlling the actuation of an airbag protecting an occupant of a vehicle seat comprising the steps of:

(a) determining in a load discriminator whether a load applied to the vehicle seat corresponds to a child or an adult using a first threshold load value and generating a corresponding first result;

(b) determining in the load discriminator whether the load applied to the vehicle seat corresponds to a child or an adult using a second threshold load value and generating a corresponding second result, wherein the second threshold value is selected based on the occupant being protected by a buckled seat belt;

(c) providing the first and second results of the determining steps to an airbag controller;

(d) determining whether the seat belt protecting the occupant is buckled;

(e) providing an input to the controller corresponding to the buckled state of the seatbelt;

(f) selecting in the controller either the first result or the second result based on the buckled state of the seat belt; and (g) controlling the airbag based on whether an adult or a child is indicated by the selected one of the first result or the second result.

3. The method of claim 2, further comprising the step of determining in a load discriminator whether the load applied to the vehicle seat corresponds to a child or an adult using a third threshold load value and generating a corresponding third result, wherein the third threshold value is selected based on a condition of a belt tension detector.

4. The method of claim 3, further comprising the step of determining in a load discriminator whether the load applied to the vehicle seat corresponds to a child or an adult using a third threshold load value and generating a corresponding third result, wherein the third threshold value is selected based on a condition of an automatic locking retractor.

5. The method of claim 2, wherein the first threshold value is selected based on the occupant not wearing a seat belt.

* * * * *